US005863675A

United States Patent [19]
Capparella et al.

[11] Patent Number: 5,863,675
[45] Date of Patent: Jan. 26, 1999

[54] MANGANESE DIOXIDE FOR LITHIUM BATTERIES

[75] Inventors: Mark Capparella, Milford, Mass.; William L. Bowden, Nashua, N.H.; Radek Fooksa, Needham, Mass.

[73] Assignee: Duracell, Inc, Bethel, Conn.

[21] Appl. No.: 881,453

[22] Filed: Jun. 24, 1997

Related U.S. Application Data

[62] Division of Ser. No. 474,871, Jun. 7, 1995, Pat. No. 5,698,176.

[51] Int. Cl.$^6$ ................................................. H01M 4/50
[52] U.S. Cl. ........................... 429/224; 205/539; 423/605
[58] Field of Search ........................... 429/224; 205/539; 423/605

[56] References Cited

U.S. PATENT DOCUMENTS

| | | | |
|---|---|---|---|
| 2,956,860 | 10/1960 | Welsh | 23/145 |
| 3,065,155 | 11/1962 | Welsh | 204/83 |
| 3,900,385 | 8/1975 | Era et al. | 205/539 |
| 4,277,360 | 7/1981 | Mellors et al. | 429/224 |
| 4,312,930 | 1/1982 | Hunter | 429/224 |
| 4,665,049 | 5/1987 | Miyai et al. | 423/605 |
| 4,921,689 | 5/1990 | Walker et al. | 423/605 |
| 4,959,282 | 9/1990 | Dahn et al. | 429/224 |
| 5,156,934 | 10/1992 | Kainthia et al. | 429/224 |
| 5,166,012 | 11/1992 | Rossouw et al. | 429/224 |
| 5,482,796 | 1/1996 | Wang et al. | 423/605 |

FOREIGN PATENT DOCUMENTS

| | | | |
|---|---|---|---|
| 52-73328 | 6/1977 | Japan | H01M 4/50 |
| 5273328 | 6/1977 | Japan | . |
| 126263 | 10/1981 | Japan | 423/605 |
| 61-16473 | 1/1986 | Japan | H01M 4/50 |
| 6116473 | 1/1986 | Japan | . |
| 62-126556 | 6/1987 | Japan | H01M 4/50 |
| 62126556 | 6/1987 | Japan | . |

OTHER PUBLICATIONS

Thackeray, M.M. and DeKock, A.; JSSCBI, 74 (1988), pp. 414–418; "Synthesis of γ–$MnO_2$ from $LiMnO_4$ for $LiMnO_2$ Battery Applications".

Thackeray, M.M. and DeKock, A. JSSCBI, 74 (1988), pp. 414–418; Synthesis of γ–$MnO_2$ from $LiMnO_4$ for $LiMnO_2$ Battery Applications.

*Primary Examiner*—Bruce F. Bell
*Attorney, Agent, or Firm*—Barry D. Josephs; Paul I. Douglas

[57] ABSTRACT

Disclosed is a process for treating manganese dioxide containing ion-exchangeable cations by replacing the ion-exchangeable cations present in the manganese dioxide with lithium by a process comprising first replacing ion-exchangeable cations present in the manganese dioxide with hydrogen. This readily is accomplished by slurrying the manganese dioxide in an aqueous acid solution. The resulting acidic manganese dioxide then is neutralized with a basic solution of a lithium containing compound, such as lithium hydroxide. This neutralization step serves to accomplish replacement of the previously introduced hydrogen, by ion-exchange, with lithium. The manganese dioxide then is washed with water, dried, and heat-treated at an elevated temperature, in conventional manner, to convert the gamma manganese dioxide to a mixture of the gamma and beta forms, which then is used as the active cathodic component in an electrochemical cell.

4 Claims, No Drawings

MANGANESE DIOXIDE FOR LITHIUM BATTERIES

This application is a division of application Ser. No. 08/474,871, filed Jun. 7, 1995, now U.S. Pat. No. 5,698,176.

The present invention relates to an improved manganese dioxide, a method for preparing the improved manganese dioxide, and the use of the improved manganese dioxide in an electrochemical cell. In particular, the invention relates to an electrolytic manganese dioxide, and its use in a lithium electrochemical cell.

Electrochemical cells, such as electric storage batteries, commonly feature a metallic anode and a cathode of an active material that can accept ions of the metal. To serve as a medium to transmit ions, an electrolyte is disposed in contact with both the anode and the cathode. During discharge of the battery, metal ions leave the anode, enter the electrolyte, and then are taken up by the active material of the cathode, resulting in the release of electrons from the cathode. One common type of electrochemical cell consists of an anode of a light alkaline metal, such as lithium, and a cathode active material which is the oxide of a transition metal, such as manganese dioxide.

Manufacturers of manganese dioxide generally use an electrolytic process whereby manganese sulfate undergoes electrolysis in a sulfuric acid solution. The resulting electrolytic manganese dioxide (EMD) possesses residual surface acidity from the sulfuric acid utilized in its preparation, which must be neutralized before it can be effectively employed in electrochemical cells. While other bases such as $Ca(OH)_2$ or $NH_4OH$ have been proposed for this use, a sodium hydroxide solution most often is used for effecting this neutralization. Sodium hydroxide is favored because of cost, availability, and environmental concerns, as well as compatibility with product end use.

The neutralization step unavoidably results in the introduction of cations into the $MnO_2$; the employment of sodium hydroxide as the neutralizing base for the EMD product, results in the introduction of sodium primarily onto the surface of the manganese dioxide. It now is hypothesized that when this neutralized EMD is used as the active material of a cathode, the residual, ion-exchangeable sodium can be released upon discharge of the cell. It appears that the sodium exchanges with the lithium ion in the electrolyte of the cell, and thus is made available for initiation of reactions leading to degradation of the lithium anode. Sodium ions from the electrolyte solution apparently deposit on the lithium anode; the sodium exchanges with lithium, and then the metallic Na can react with the electrolyte. While metallic Li also can react with the electrolyte, carbonates serve to passivate Li and prevent further reaction, but are ineffective to passivate Na. Accordingly, the shelf or storage life of the lithium cell is adversely effected. To avoid this problem, a process now has been developed for making an improved manganese dioxide.

It now has been discovered that the storage life and load voltage of a lithium primary electrochemical cell are increased if the ion-exchangeable sodium content of the manganese dioxide cathodic electrode material is reduced. Pursuant to a preferred embodiment, the ion-exchangeable sodium present in an electrolytic manganese dioxide is substituted with lithium, to thereby avoid sodium contamination of the lithium cell anode.

Electrolytic manganese dioxide features a gamma crystalline structure. It long has been appreciated that before gamma manganese dioxide can be used as cathode material in a lithium cell, the manganese dioxide must be heat-treated, both to remove water and to change the crystal structure from the gamma phase to a predominantly beta phase. For manganese dioxide to have adequate performance as a cathode active material in a lithium battery, it has been found that the percentage of beta crystalline form should be at least 30% but less than 90%. Outside of this range, the cathode utilization is inferior to the utilization of material within this range.

According to the present invention, ion-exchangeable sodium present in the EMD is removed and replaced with lithium prior to thermal conversion of the manganese dioxide from the gamma form to the predominantly beta form.

Replacing the ion-exchangeable sodium present in the EMD with lithium is accomplished by a process comprising first replacing ion-exchangeable sodium in the EMD with hydrogen. This readily is accomplished by slurrying the EMD in an aqueous acid solution. The resulting acidic EMD then is neutralized with a basic solution of a lithium containing compound, such as lithium hydroxide. This neutralization step serves to accomplish replacement of the previously introduced hydrogen, by ion-exchange, with lithium. The EMD then is washed with water, dried, and heat-treated at an elevated temperature, in conventional manner, to convert the gamma EMD to a mixture of the gamma and beta forms, which then is used as the active cathodic component in an electrochemical cell.

Care must be exercised to avoid direct contact of the manganese dioxide with a strong basic media. This appears to destroy the particle integrity of the EMD resulting in sub-micron particle size $MnO_2$. Once the clusters of $MnO_2$ crystallites are disrupted, the sub-micron $MnO_2$ becomes a difficult to process slime which is not useful as an electrochemically active material in cells. A difficult and costly process is involved to reconstitute the $MnO_2$ into useful, large size particles. Contacting particulate EMD with a high pH LiOH solution may also serve to introduce lithium into the crystal lattice of the $MnO_2$, thereby altering its crystal structure into a form which is not useful as a cathodic active material.

In the present process, first treating the NaOH—neutralized EMD with acid serves to replace the ion-exchangeable sodium with hydrogen. The hydrogen then can readily be exchanged with lithium through controlled addition of a basic solution of a lithium compound to a slurry of the $MnO_2$ to raise the pH of the slurry. This controlled neutralization minimizes the breaking down of the crystal clusters of the $MnO_2$ which feature advantageous mechanical/physical properties.

As described above, the gamma manganese dioxide produced by the acid electrolysis of manganese sulfate in sulfuric acid is typically washed with aqueous sodium hydroxide to neutralize the surface acidity of the EMD product. This neutralization introduces ion-exchangeable sodium into the $MnO_2$, primarily at its surface. The amount of sodium ion present in the EMD generally ranges from about 800 ppm to about 3000 ppm; if the EMD is thermally converted to the beta form for use in a lithium cell, this sodium content still is retained by the $MnO_2$. According to the present invention, it has been found that for use in a lithium cell, it is preferred that the gamma/beta $MnO_2$ contains less than about 1000 ppm Na, more preferably less than about 800 ppm, and most preferably less than about 400 ppm. Therefore, the sodium content of the EMD generally needs to be reduced.

In one embodiment of the presently invented process, particulate EMD, having an average particle size ranging from about 10 to about 50 microns, and having a sodium content ranging from about 800 ppm to about 3000 ppm (after NaOH neutralizing) is slurried in an aqueous acid solution for a time sufficient to replace the ion-exchangeable sodium in the EMD with hydrogen. EMD is formed in a sulfuric acid media and generally contains about 1% sulfate by weight. The sulfuric acid slurry is allowed to settle and the supernatant liquid is removed. Any strong acid may be used for the acid treatment, such as phosphoric acid, nitric acid, and sulfuric acid. Sulfuric acid is the preferred acid, because it is relatively inexpensive, readily available, and generally free of adverse contaminants.

An aqueous solution of a lithium compound then is gradually introduced to a slurry of the acid-treated, ion-exchanged EMD to exchange the hydrogen ions with lithium ions. The lithium compound may be any water soluble lithium salt including lithium hydroxide, lithium carboxylate, lithium carbonate, lithium benzoate, lithium sulfate, lithium nitrate, and the like. Lithium hydroxide is preferred. As the lithium cation replaces the hydrogen in the $MnO_2$, the acidity of the slurry gradually decreases. Hence, if an alkaline solution containing lithium cation is employed to ion-exchange the hydrogen, the progress of the ion-exchange conveniently can be monitored by tracing the pH of the solution. Once the $MnO_2$ is ion-exchanged to a suitable degree, the lithium-containing EMD then is washed with deionized water to remove any excess lithium salt remaining on the particles.

As indicated above, it is advantageous to reduce the sodium content of the $MnO_2$, although a certain level of sodium content can be tolerated without significant adverse effects on the performance of the electrochemical cell in which the $MnO_2$ is utilized. Accordingly, the present process of reducing the sodium content to a desirable level, accommodates the use of economical, commercial grades of reagents which may include some sodium content, which previously could not be tolerated as a contaminant. If, for example, commercial grade sulfuric acid and/or lithium hydroxide is employed in the ion-exchange process, the degree of ion-exchange can be adjusted to compensate for any additional sodium introduced with the reagents.

If the manganese dioxide is to be used in a lithium primary cell, the gamma EMD needs to be converted to the beta crystalline form. Actually, the gamma $MnO_2$ is only partially converted, such that at least about 30% by weight of the gamma $MnO_2$ is converted to the beta form. Preferably, from about 60% to about 90% by weight of the gamma $MnO_2$ is converted to the beta form, as is known to those skilled in the art, and as is taught, for example, in commonly assigned U.S. Pat. No. 4,921,689. Following the thermal conversion of the EMD to convert gamma $MnO_2$ to the beta form, a cathode can be prepared from the $MnO_2$ utilizing conventional formulation techniques. For example, the converted $MnO_2$ is combined with a conductive agent, such as carbon black, along with a binder agent, such as PTFE, to form an admixture, and then the $MnO_2$ admixture is formed into a cathode structure.

Beta-converted $MnO_2$ typically is used as the electrochemically active cathode component for electrochemical cells having a non-aqueous electrolyte. For example, in a standard button cell, the $MnO_2$ admixture is pressed into a disc shape; in a standard spirally wound cell, the admixture is applied to at least one side of a suitable substrate. The subtrate may or may not be porous, depending on the particular design of the cell.

One type of spirally wound cell is fabricated using the commonly known "jelly roll" type of construction, wherein an electrode group comprises a roll of a ribbon-like structure having alternate layers of a positive electrode, a separator, and a negative electrode spirally wound to position the negative electrode on the outside thereof. The separator, designed to separate positive and negative electrodes from shorting against each other, typically is a microporous polypropylene. The cell comprises a stainless steel cylindrical can with an electrically insulating member on the interior bottom surface. The cell also contains a nonaqueous electrolyte comprising one or more lithium salts dissolved in a non-aqueous solvent. As is known in the art, suitable lithium salts include $LiAsF_6$, $LiBF_4$, $LiCF_3SO_3$, $LiClO_4$, $LiN(CF_3SO_2)_2$, $LiPF_6$, and mixtures thereof, and the like; suitable non-aqueous solvents include dimethoxyethane, diethylcarbonate, diethoxyethane, dimethylcarbonate, ethylene carbonate, propylene carbonate, and mixtures thereof, and the like. The positive electrode is a beta-converted $MnO_2$ pressed onto a suitable substrate; the negative electrode is a lithium metal foil. An insulator layer is placed over the electrode assembly at the top of the cell, and the top of the cell is sealed with a plastic sealing member through which a positive terminal is placed and electrically connected to the positive electrode. The negative electrode is in electrical contact with the container, which is the negative terminal.

In a typical "button" type primary lithium electrochemical cell, a metal container serves as the positive terminal, having a metal cap serving as the negative terminal, with a plastic insulating and sealing member sealing the cap to the container while separating the cap from the container. The negative electrode is lithium metal in electrical contact with the cap via a collector layer. A pressed disc of beta converted manganese dioxide serves as the positive electrode in electrical contact with the positive terminal metal container through another collector layer.

While the beta-converted, lithium-exchanged manganese dioxide has been found, pursuant to the present invention, in particular, to be an improved cathode material for a lithium primary cell, the lithium-exchanged gamma $MnO_2$ (prior to thermal conversion to the beta form) also is useful as an electrochemically active cathode component for other types of cells including those cells employing an aqueous electrolyte, such as zinc-alkaline and other cells. Zinc alkaline cells, as is commonly known in the art, comprise a cylindrical metal container, closed at one end, and sealed at the other end by means of a seal assembly. These cells contain a zinc powder gel as the electrochemically active anodic component, gamma $MnO_2$ as the electrochemically active cathodic component, and an alkaline potassium hydroxide solution as the electrolyte. The $MnO_2$ is in physical and concomitant electrical contact with the metal can which constitutes the positive terminal of the cell, and a metal current collector, typically referred to as a "nail", is in physical and electrical contact with the gelled zinc anode, and also with the metal end cap. The metal end cap serves as the negative terminal of the cell.

The following examples are provided to illustrate the invention and demonstrate the improved properties of the invented $MnO_2$ when utilized as the cathode member in a lithium-manganese dioxide electrochemical cell.

EXAMPLE 1

A lithium-exchanged electrolytic manganese dioxide was prepared in the following manner:

A one kg. portion of commercial grade, NaOH-neutralized EMD (gamma $MnO_2$), having an average particle size of about 50 microns and containing about 2200 ppm of sodium, was slurried in a flask containing two liters of one molar sulfuric acid. The slurry was stirred for about two hours at ambient temperature, after which the EMD particles were allowed to settle out of suspension. The liquid in the flask then was siphoned off. A fresh two liter portion of one molar sulfuric acid was added; the $MnO_2$ solids were again slurried by stirring for another two hours, after which the solids again were permitted to settle out and the liquid was siphoned off. The remaining solids, acid-treated, hydrogen ion-exchanged or protonated EMD, were rinsed by slurrying them in three liters of deionized water by stirring for about one hour. The solids then were allowed to settle out, the liquid was siphoned off, and the washed solids were reslurried in two liters of fresh deionized water.

Lithium hydroxide next was slowly added to the stirred suspension, while monitoring the pH of the slurry. The portions of lithium hydroxide were continued to be added until the pH of the slurry stabilized between about 7 and 7.5. This pH was indicative that the ion-exchangeable hydrogen in the manganese dioxide had been replaced with lithium ion.

The slurry then was vacuum filtered through a fritted glass funnel, and the collected solids were rinsed three times by allowing 100 ml portions of deionized water to be vacuum filtered through the solids on the funnel. The rinsed solids were allowed to dry under ambient conditions on the fritted glass funnel for about 16 hours, then were transferred into a glass beaker and dried at 125° C. under vacuum for about 24 hours. The dried lithium-exchanged, gamma $MnO_2$ then was partially converted to the beta form by heating it at 400° C. for about six hours, followed by cooling down to room temperature over another six hour period.

The beta converted $MnO_2$ then was made into a mull mix by mixing together 90% by weight $MnO_2$, 4% acetylene black, and 2% graphite using a Turbula Mixer, and then adding 4% PTFE and alcohol to make a paste. The paste was passed into a nickel foil substrate and assembled as a cathodes for 2/3A size primary lithium cells of jelly roll type, generally described above, using a lithium foil as the anode material. The cells were filled with an electrolyte comprising 30% propylene carbonate and 70% dimethoxyethane with 0.5M $LiCF_3SO_3$ salt.

Comparative Example A

In this example, the NaOH-neutralized EMD starting material was neither acid-treated, washed, nor neutralized as outlined in Example 1. The non-exchanged EMD was directly thermally converted to the beta form of $MnO_2$ and incorporated as cathode material in lithium cells as described in Example 1.

Comparative Example B

In the same general manner as outlined in Example 1, an EMD sample was prepared in which the NaOH-neutralized EMD was washed with water. The washed EMD then was beta-converted and processed into cathode material which was incorporated into cells as in Example 1.

Comparative Example C

In the same general manner as outlined in Example 1, an EMD sample prepared in which the acid-treated and washed EMD was neutralized with $Ca(OH)_2$, in place of LiOH. The resulting Ca-exchanged, gamma $MnO_2$ then was converted to the beta form and processed into cathode material for electrochemical cells as in Example 1.

Comparative Example D

In the same general manner as outlined in Example 1, an EMD sample was prepared in which the acid-treated and washed EMD was neutralized with $NH_4OH$, in place of LiOH. The resulting $NH_4$-exchanged, gamma $MnO_2$ then was converted to the beta form and processed into cathode material for electrochemical cells as in Example 1.

Comparative Example E

In the same general manner as outlined in Example 1, an EMD sample was prepared in which the acid-treated and washed EMD was neutralized with, 10N NaOH, in place of LiOH. The resulting $MnO_2$, with reintroduced Na, then was converted to the beta form and processed into cathode material for cells as in Example 1.

Samples of $MnO_2$ were taken during each of the above-described examples, and analyzed for cation content. The samples were extracted at the processing stage after the starting material, NaOH-neutralized EMD was acid-washed, base-neutralized, and water washed. The sample from Comparative Example A represents untreated, starting material EMD, since in this example, the $MnO_2$ was not acid-washed or base-neutralized. The sample from Comparative Example B was taken after acid-wash and water rinsing, since no base-neutralization was applied. Table I, below, shows the cation contents determined from analysis.

TABLE I

| Example Number | Neutralizing Base | PPM $Na^+$ | PPM $K^+$ | PPM $Mg^{2+}$ | PPM $Ca^{2+}$ | PPM $Li^+$ | PPM $NH_4+$ |
|---|---|---|---|---|---|---|---|
| Example 1 | LiOH | 500 | 420 | 35.6 | 240 | 3600 | 220 |
| Comparative A | (NONE) | 1057 | 524 | 184 | 864 | <10 | <25 |
| Comparative B | (Water-Wash only) | 900 | 450 | 113 | 530 | — | <25 |
| Comparative C | $Ca(OH)_2$ | 466 | 536 | 119 | 9100 | — | <25 |
| Comparative D | $NH_4OH$ | 700 | 430 | 44.0 | 220 | 1.3 | 2500 |
| Comparative E | NaOH | 4300 | 430 | 38.0 | 220 | 1.0 | <25 |

The cells prepared according to the above examples were tested for load voltage. The cells were then discharged in a high rate pulse test (1.8A for 3 seconds, rest for 7 seconds) to a 1.7 V cutoff. The results are summarized in Table II.

Cells were further tested on an intermittent storage regime (50 pulses 1.8A for 3 sec., 7 sec. rest per week with storage at 60° C.). This aggressive test evaluated the stability of the battery. Results are reported in Table III.

TABLE II

HIGH RATE PULSE TEST

| Example Number | Neutralizing Base | Number of Pulses | Average Voltage |
|---|---|---|---|
| Comparative A | Untreated | 590 ± 28.0 | 2.04 ± 0.018 |
| Example 1 | LiOH | 637 ± 16.7 | 2.12 ± 0.010 |
| Comparative B | $H_2O$ | 644 ± 18.1 | 2.03 ± 0.015 |
| Comparative C | $Ca(OH)_2$ | 597 ± 25.0 | 2.02 ± 0.020 |
| Comparative D | $NH_4OH$ | 653 ± 17.7 | 2.06 ± 0.024 |
| Comparative E | NaOH | 531 ± 23.1 | 1.98 ± 0.023 |

TABLE III

| | | INTERMITTENT STORAGE TEST | | | | | |
|---|---|---|---|---|---|---|---|
| NEUTRALIZING | EXAMPLE | LOAD VOLTAGE AT WEEK: | | | | | |
| BASE | NUMBER | 0 | 1 | 2 | 3 | 4 | 5 |
| Untreated | Comparative A | 2.11 ± 0.026 | 2.12 ± 0.036 | 2.04 ± 0.027 | 2.02 ± 0.029 | 1.98 ± 0.028 | 1.90 ± 0.084 |
| LiOH | Example 1 | 2.17 ± 0.011 | 2.25 ± 0.012 | 2.20 ± 0.015 | 2.26 ± 0.014 | 2.26 ± 0.022 | 2.27 ± 0.028 |
| $H_2O$ | Comparative B | 2.08 ± 0.015 | 2.10 ± 0.025 | 2.06 ± 0.030 | 2.05 ± 0.024 | 2.05 ± 0.030 | 2.02 ± 0.024 |
| $Ca(OH)_2$ | Comparative C | 2.09 ± 0.015 | 2.11 ± 0.029 | 2.08 ± 0.037 | 2.08 ± 0.041 | 2.09 ± 0.043 | 2.08 ± 0.047 |
| $NH_4OH$ | Comparative D | 2.07 ± 0.028 | 2.08 ± 0.022 | 2.04 ± 0.026 | 2.08 ± 0.027 | 2.09 ± 0.026 | 2.08 ± 0.019 |
| NaOH | Comparative E | 2.12 ± 0.013 | 2.03 ± 0.036 | 1.75 ± 0.176 | FAILED | → | → |

While the invention has been described with reference to specific embodiments thereof, it is intended that all matter contained in the above description or shown in the accompanying drawings be interpreted as illustrative and not limiting in nature. Various modifications of the disclosed embodiments, as well as other embodiments of the invention, will be apparent to those skilled in the art upon reference to this description, or may be made without departing from the spirit and scope of the invention defined in the appended claims.

What is claimed is:

1. An electrochemical cell comprising a lithium anode, an electrolyte, and a cathode comprising manganese dioxide, said manganese dioxide made by a process for treating gamma electrolytic manganese dioxide (EMD) wherein the gamma EMD is prepared by subjecting a solution of manganese sulfate to electrolysis in a sulfuric acid solution, the improvement comprising:

a) treating the EMD in a solution comprising sodium hydroxide to neutralize residual surface acidity of the EMD resulting from said electrolysis in sulfuric acid solution, b) mixing the neutralized EMD in an aqueous acid solution to replace ion-exchangeable sodium in the EMD with hydrogen to produce an intermediate treated EMD having reduced sodium content, c) treating said intermediate treated EMD with an aqueous basic solution including a lithium compound selected from the group consisting of lithium hydroxide, lithium carboxylate, lithium carbonate, lithium benzoate, lithium sulfate, lithium nitrate and mixtures thereof, to replace the hydrogen introduced into the EMD in step (b) with lithium to produce an EMD product containing lithium.

2. An electrochemical cell comprising a lithium anode, an electrolyte, and a cathode comprising manganese dioxide, said manganese dioxide made by a process for treating gamma electrolytic manganese dioxide (EMD) wherein the gamma EMD is prepared by subjecting a solution of manganese sulfate to electrolysis in a sulfuric acid solution, the improvement comprising:

a) treating the EMD in a solution comprising sodium hydroxide to neutralize residual surface acidity of the EMD resulting from said electrolysis in sulfuric acid solution, b) mixing the neutralized EMD in an aqueous acid solution to replace ion-exchangeable sodium in the EMD with hydrogen to produce an intermediate treated EMD having reduced sodium content, c) treating said intermediate treated EMD with an aqueous basic solution comprising lithium hydroxide to replace the hydrogen introduced into the EMD in step (b) with lithium to produce an EMD product containing lithium.

3. An electrochemical cell comprising a lithium anode, an electrolyte, and a cathode comprising manganese dioxide, said manganese dioxide made by a process for treating gamma electrolytic manganese dioxide (EMD) wherein the gamma EMD is prepared by subjecting a solution of manganese sulfate to electrolysis in a sulfuric acid solution, the improvement comprising:

a) treating the EMD in a solution comprising sodium hydroxide to neutralize residual surface acidity of the EMD resulting from said electrolysis in sulfuric acid solution, b) mixing the neutralized EMD in an aqueous acid solution to replace ion-exchangeable sodium in the EMD with hydrogen to produce an intermediate treated EMD having reduced sodium content, c) treating said intermediate treated EMD with an aqueous basic solution including a lithium compound selected from the group consisting of lithium hydroxide, lithium carboxylate, lithium carbonate, lithium benzoate, lithium sulfate, lithium nitrate and mixtures thereof, to replace the hydrogen introduced into the EMD in step (b) with lithium to produce an EMD product containing lithium, wherein the sodium content of said EMD product is less than 1000 ppm.

4. An electrochemical cell comprising a lithium anode, an electrolyte, and a cathode comprising manganese dioxide, said manganese dioxide made by a process for treating gamma electrolytic manganese dioxide (EMD) wherein the gamma EMD is prepared by subjecting a solution of manganese sulfate to electrolysis in a sulfuric acid solution, the improvement comprising:

a) treating the EMD in a solution comprising sodium hydroxide to neutralize residual surface acidity of the EMD resulting from said electrolysis in sulfuric acid solution, b) mixing the neutralized EMD in an aqueous acid solution to replace ion-exchangeable sodium in the EMD with hydrogen to produce an intermediate treated EMD having reduced sodium content, c) treating said intermediate treated EMD with an aqueous basic solution including a lithium compound selected from the group consisting of lithium hydroxide, lithium carboxylate, lithium carbonate, lithium benzoate, lithium sulfate, lithium nitrate and mixtures thereof, to replace the hydrogen introduced into the EMD in step (b) with lithium to produce an EMD product containing lithium, d) thermally treating said manganese dioxide containing lithium at a temperature of at least about 350° C. for a time sufficient to convert at least about 30% by weight of said manganese dioxide from the gamma to the beta form.

* * * * *